US012217250B2

(12) United States Patent
Wieker et al.

(10) Patent No.: US 12,217,250 B2
(45) Date of Patent: Feb. 4, 2025

(54) SECURE CONTACTLESS CREDENTIAL EXCHANGE

(71) Applicant: Capital One Services, LLC, McLean, VA (US)

(72) Inventors: Jeffrey Carlyle Wieker, Fairfax, VA (US); Eric Medin, Fairfax, VA (US); Kaushal Wadhwani, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 74 days.

(21) Appl. No.: 17/135,443

(22) Filed: Dec. 28, 2020

(65) Prior Publication Data

US 2022/0207526 A1 Jun. 30, 2022

(51) Int. Cl.
*G06Q 20/38* (2012.01)
*G06Q 20/32* (2012.01)

(52) U.S. Cl.
CPC ... *G06Q 20/38215* (2013.01); *G06Q 20/3226* (2013.01); *G06Q 20/3227* (2013.01); *G06Q 20/3276* (2013.01); *G06Q 20/386* (2020.05)

(58) Field of Classification Search
None
See application file for complete search history.

(56) References Cited

U.S. PATENT DOCUMENTS

| | | | | |
|---|---|---|---|---|
| 11,144,905 B1* | 10/2021 | Wilkinson | | H04W 8/005 |
| 2011/0270751 A1* | 11/2011 | Csinger | | G06F 21/40 |
| | | | | 705/42 |
| 2013/0246258 A1 | 9/2013 | Dessert | | |
| 2015/0095238 A1* | 4/2015 | Khan | | G06Q 20/382 |
| | | | | 705/71 |
| 2015/0317626 A1* | 11/2015 | Ran | | G06Q 20/3278 |
| | | | | 705/76 |
| 2016/0092858 A1* | 3/2016 | Giles | | G06Q 20/227 |
| | | | | 705/14.1 |

(Continued)

FOREIGN PATENT DOCUMENTS

| | | | | |
|---|---|---|---|---|
| EP | 3699851 A1 * | 8/2020 | | G06Q 20/027 |
| WO | WO-2020025141 A1 * | 2/2020 | | G06Q 20/027 |

OTHER PUBLICATIONS

Sierra, N., "U.S. Merchant Adoption of Contactless Mobile Payment Technology: Near Field Communication", University of Nebraska, Jun. 2013. (Year: 2013).*

(Continued)

*Primary Examiner* — Clay C Lee
(74) *Attorney, Agent, or Firm* — Harrity & Harrity, LLP (57) ABSTRACT

In some implementations, a credential device may receive a request to generate a virtual credential from a user device associated with a first unique identifier, wherein the request includes a second unique identifier associated with a terminal to receive the virtual credential. The credential device may generate the virtual credential based on the request and a primary credential associated with the first unique identifier, wherein the virtual credential is associated with the primary credential and valid only for an entity associated with the terminal. The credential device may transmit information associated with the virtual credential to the terminal associated with the second unique identifier.

20 Claims, 7 Drawing Sheets

(56) References Cited

U.S. PATENT DOCUMENTS

| | | | | |
|---|---|---|---|---|
| 2016/0150078 A1* | 5/2016 | Joshi | ............ | G06Q 30/0238 |
| | | | | 705/14.23 |
| 2017/0091765 A1* | 3/2017 | Lloyd | ............ | G06Q 20/321 |
| 2019/0180310 A1* | 6/2019 | Jones | ............ | G06Q 20/367 |
| 2020/0082427 A1* | 3/2020 | Gleeson | ......... | G06Q 30/0226 |
| 2021/0233066 A1* | 7/2021 | Mullaney | ......... | G06Q 20/326 |

OTHER PUBLICATIONS

"How to Offer QR Code Payments in Any Restaurant," PRESTO, Apr. 30, 2020, 3 pages. [Retrieved on Dec. 28, 2020 from https://presto.com/2020/04/30/benefits-of-qr-code-payments-in-restaurants].
Extended European Search Report for Application No. EP21217266, mailed on May 25, 2022, 10 pages.

* cited by examiner

SECURE CONTACTLESS CREDENTIAL EXCHANGE

BACKGROUND

Transactions often involve use of a transaction card (e.g., a credit card, a debit card, a gift card, an automated teller machine (ATM) card, a rewards card, and/or a client loyalty card) to pay for goods and/or services at a transaction terminal (e.g., a point-of-sale (PoS) terminal). For example, the transaction card may be swiped at a card reader, inserted into a chip reader, and/or used to wirelessly transmit transaction card data to a wireless receiver. In some instances, a transaction card may include a magnetic strip, an integrated circuit (IC) chip, a radio frequency (RF) antenna, a radio frequency identification (RFID) tag, and/or other electronic components to provide information associated with the transaction card (e.g., an account identifier, account information, and/or a payment token) to facilitate a contactless transaction. For example, in a contactless transaction, the transaction card or a handheld device (e.g., a smartphone) linked to the transaction card can be waved over a reader at the transaction terminal. Accordingly, contactless transactions are generally made in close physical proximity to a transaction terminal, unlike mobile transactions that utilize wide area cellular networks and/or wireless local area networks to transfer transaction card data without requiring close physical proximity.

SUMMARY

In some implementations, a system for securely providing a credential includes one or more memories and one or more processors, communicatively coupled to the one or more memories, configured to: receive a request to generate a virtual credential from a user device associated with a first unique identifier, wherein the request includes a second unique identifier associated with a terminal to receive the virtual credential; generate the virtual credential based on the request and a primary credential associated with the first unique identifier, wherein the virtual credential is associated with the primary credential and valid only for an entity associated with the terminal; and transmit information associated with the virtual credential to the terminal associated with the second unique identifier.

In some implementations, a method for securely providing a credential includes receiving, by a credential device, a request to generate a virtual credential from a user device associated with a first unique identifier, wherein the request includes a second unique identifier associated with a terminal to receive the virtual credential; transmitting, to the user device, a message to validate that a user of the user device is authorized to access a primary credential associated with the first unique identifier; generating, by the credential device, the virtual credential based on receiving information indicating that the user is authorized to access the primary credential, wherein the virtual credential is associated with the primary credential; and transmitting, by the credential device, information associated with the virtual credential to the terminal associated with the second unique identifier.

In some implementations, a non-transitory computer-readable medium storing a set of instructions includes one or more instructions that, when executed by one or more processors, cause the one or more processors to: receive a request to generate a virtual credential from a user device associated with a first unique identifier, wherein the request includes a second unique identifier associated with a terminal to receive the virtual credential; generate the virtual credential based on the request and a primary credential associated with the first unique identifier, wherein the virtual credential is associated with the primary credential and an entity associated with the terminal; transmit information associated with the virtual credential to the terminal associated with the second unique identifier; receive information indicating that a transaction associated with the virtual credential has been processed; and associate the transaction with the primary credential based on the information indicating that the transaction associated with the virtual credential has been processed.

DETAILED DESCRIPTION

The following detailed description of example implementations refers to the accompanying drawings. The same reference numbers in different drawings may identify the same or similar elements.

Contactless payment systems have become increasingly prevalent for various reasons. For example, contactless transactions offer convenience and efficiency to customers and merchants by enabling autonomous checkout with no interaction or minimal interaction between a customer and personnel associated with the merchant. In another example, contactless transactions may be desirable because customers may not want to touch a potentially unsanitary payment terminal and/or come into close contact with other people (e.g., personnel operating the payment terminal) that may have a communicable illness. However, existing techniques to enable contactless transactions suffer from various limitations and drawbacks. For example, to conduct a contactless transaction, a paying device (e.g., a transaction card and/or a mobile device) may communicate with a receiving device (e.g., a terminal, another transaction card, and/or another mobile device) using radio frequency identification (RFID) and/or near field communication (NFC). However, some paying devices and/or receiving devices may not possess RFID and/or NFC capabilities, RFID and/or NFC capabilities may malfunction, and contactless payment systems generally require close physical proximity between the paying device and the receiving device, which may be inconsistent with the objective to avoid contact with a potentially unsanitary payment terminal and/or infectious personnel. Furthermore, contactless payment systems are often limited to small value sales because customer data (e.g., a cardholder name, credit card number, and expiration date) may be transmitted without encryption and/or without requiring signature and/or personal identification number verification. In addition, contactless payment terminals based on RFID, NFC, and/or other proximity-based communication tend to require supporting infrastructure, which inhibits widespread adoption.

Furthermore, to the extent that other techniques allow contactless payments by providing a quick response (QR)

code that a user scans at a payment terminal, the QR code typically directs the user to an online checkout page associated with a merchant where the user can enter payment information. In other cases, a bank or credit account can be linked to a mobile application that sends a payment to the merchant. However, these mobile payment techniques have security vulnerabilities because the user sends actual payment credentials to the payment terminal and/or a third-party provider that sends the payment to the merchant, creating a risk that the payment credentials could be stolen. Furthermore, these mobile payment techniques require additional integration at the payment terminal to accept payments through the online checkout page and/or to accept tokenized payment information from the third-party provider.

Some implementations described herein may enable a secure contactless credential exchange using a merchant-bound payment credential, such as a virtual card number and/or a virtual credential, that is linked to a primary payment credential, such as a credit card. For example, a user may register for a contactless transaction service via a user device (e.g., a smartphone) that is bound to the user such that the user device may be linked to a primary payment credential associated with the user. At a payment terminal, a merchant may provide a unique identifier associated with the payment terminal, which the user device may provide to a credential device (e.g., by scanning a QR code that encodes the unique identifier and/or sending a text message that includes the unique identifier to the credential device). Accordingly, the credential device may generate a virtual credential that is bound to the merchant associated with the payment terminal (e.g., a payment credential that is only valid for the merchant associated with the payment terminal) and linked to the primary payment credential associated with the user. The credential device may then transmit information associated with the virtual credential to the payment terminal, which may process the virtual credential in a similar manner as an ordinary credit card. In this way, the secure contactless credential exchange provides increased security because the virtual credential is bound to a specific merchant, and fraud is prevented based on a known linkage between the user and the user device that is used to initiate the contactless transaction. The secure contactless credential exchange described herein is also resource-efficient, as the merchant does not need to deploy any additional contactless payment infrastructure (e.g., an RFID and/or NFC reader) and/or implement any additional integrations beyond techniques that may otherwise be needed to process a credit card payment.

Figure 1A:
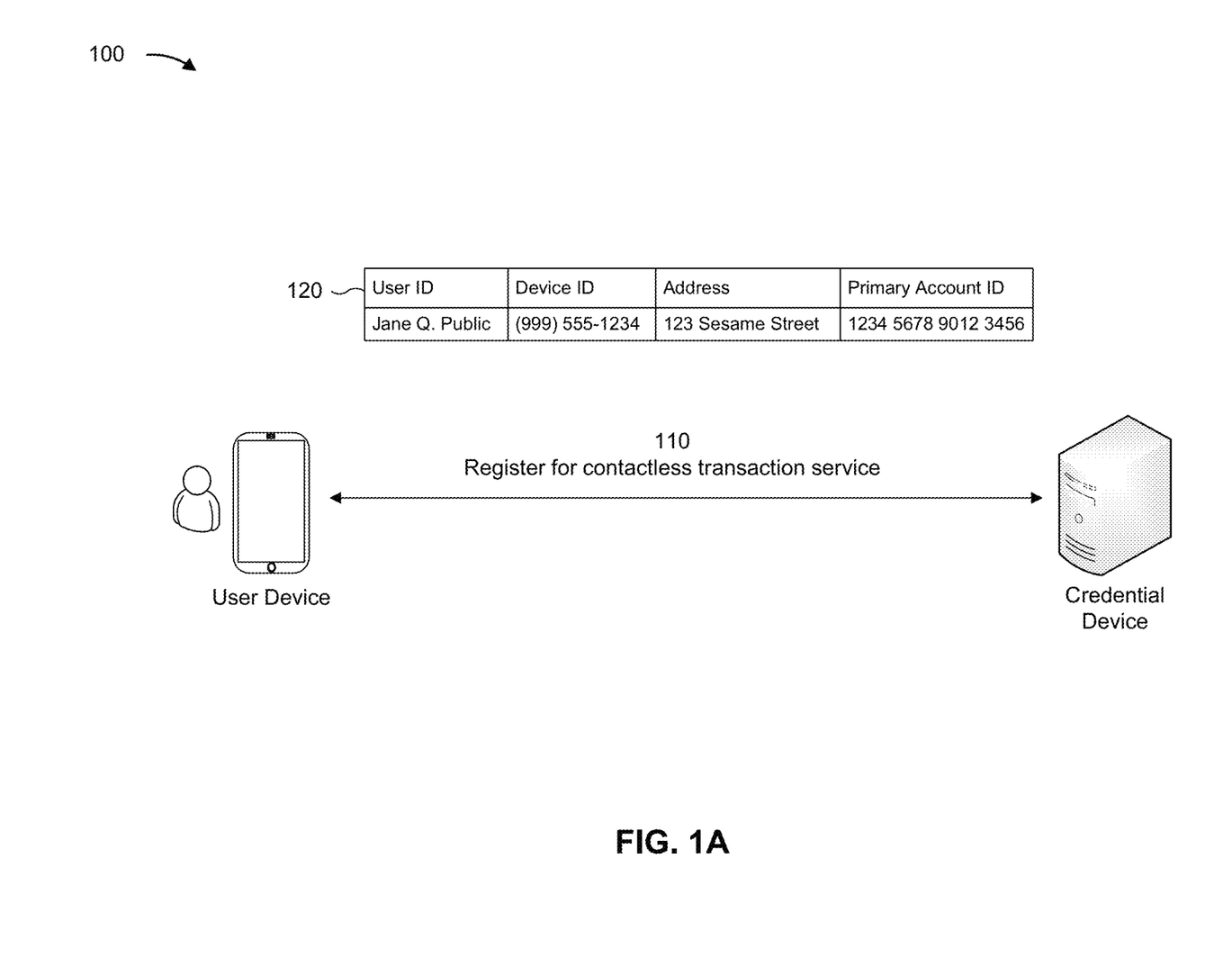
FIGS. 1A-1C are diagrams of an example implementation relating to a secure contactless credential exchange.
Figure 1B:
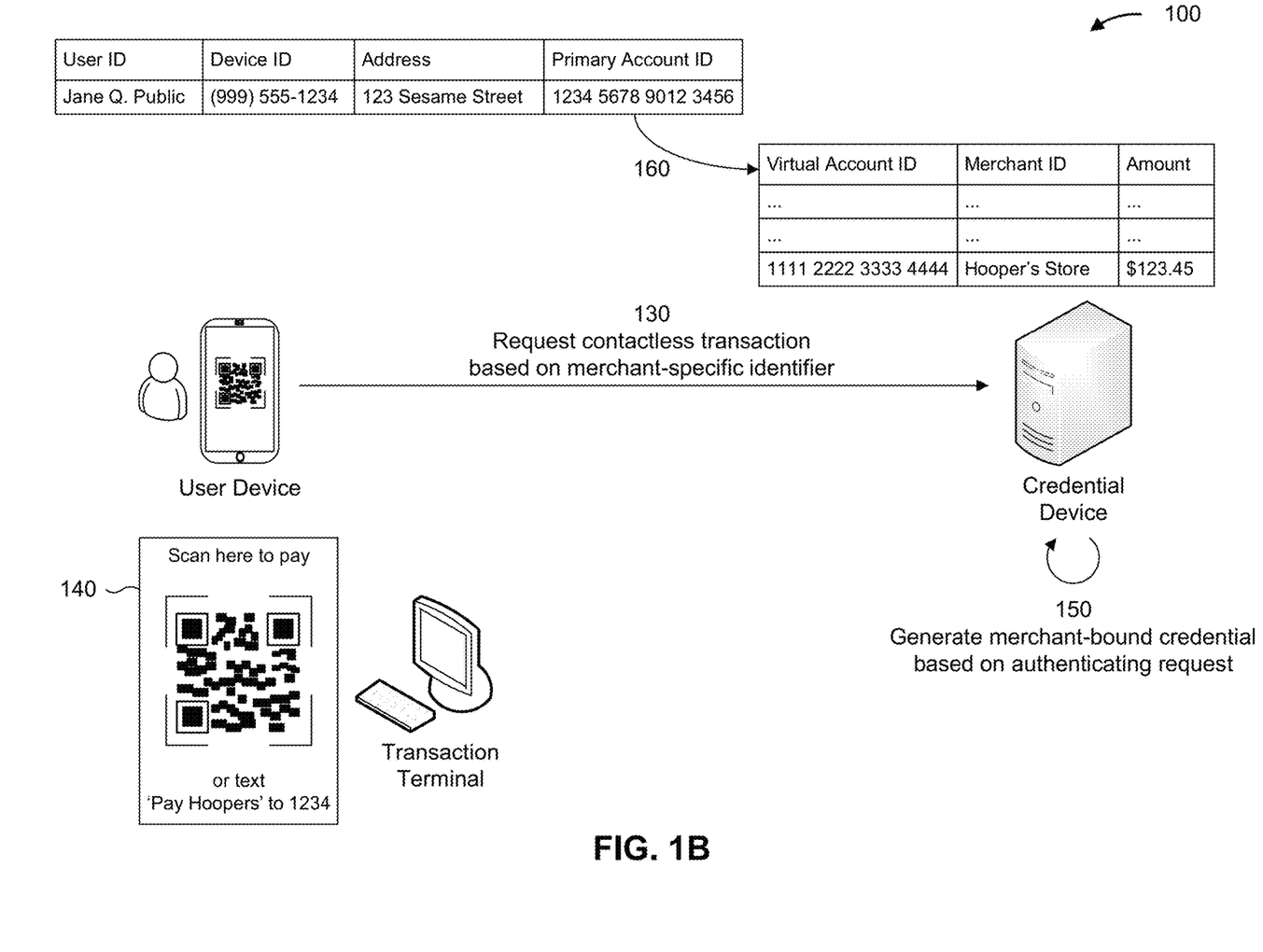
Figure 1C:
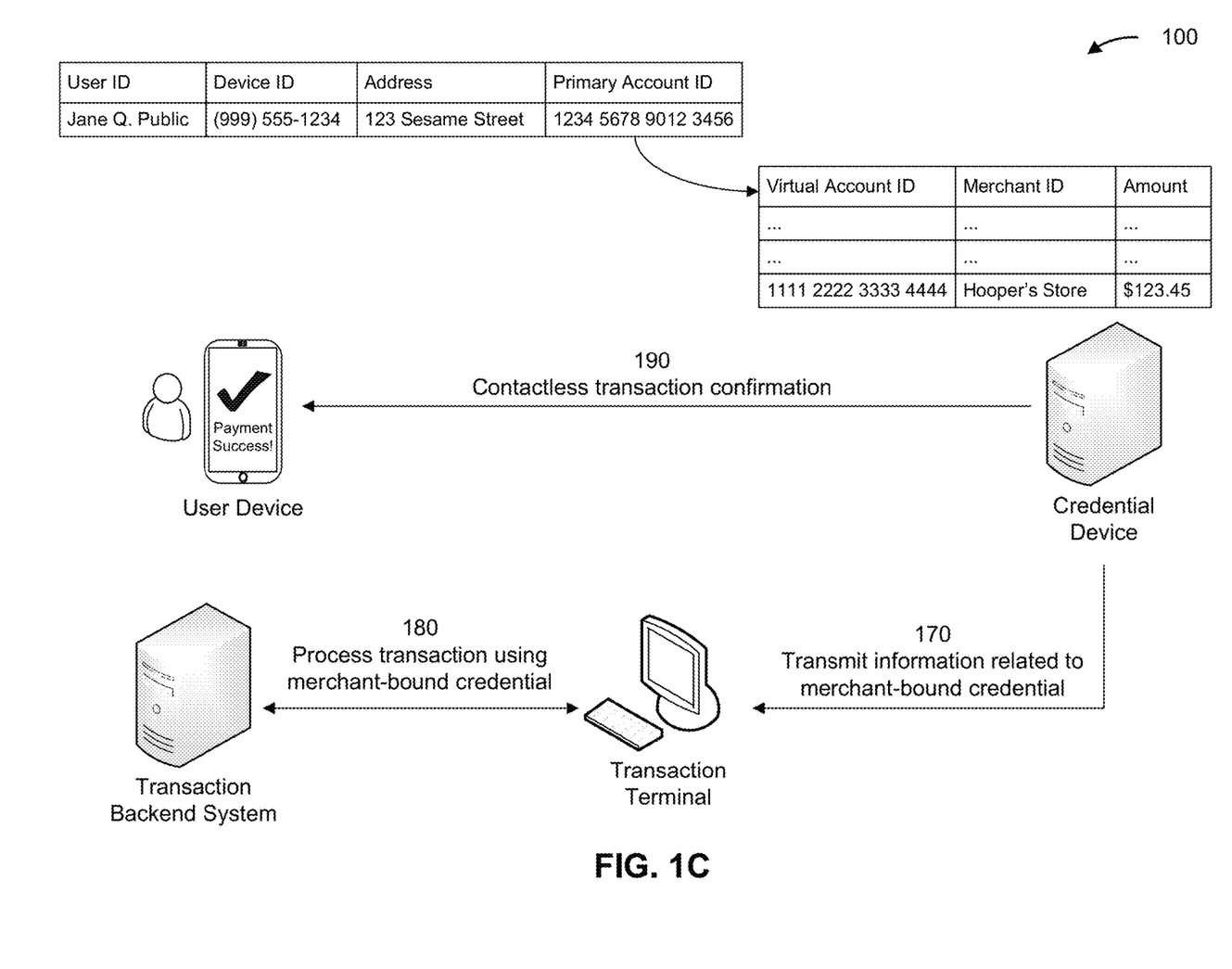

FIGS. 1A-1C are diagrams of an example 100 associated with a secure contactless credential exchange. As shown in FIGS. 1A-1C, example 100 includes communication between and/or among a user device, a credential device, and a transaction terminal. The user device, the credential device, and the transaction terminal are described in more detail below in connection with FIG. 2 and FIG. 3.

As shown in FIG. 1A, and by reference number 110, user device may communicate with credential device to register for a contactless transaction service. For example, in some implementations, a user of the user device may be associated with a primary payment credential, such as a credit card, that is issued or otherwise managed by a transaction backend system that includes or is associated with the credential device. Accordingly, when the user device is used to register for the contactless transaction service, the credential device may create a record that associates the primary payment credential with one or more attributes associated with the user and the user device. For example, as shown by reference number 120, the record may include a unique identifier associated with the user, such as a user name (e.g., the user's legal name and/or a login name used to access an account associated with the primary payment credential), which may be stored in association with the primary payment credential (e.g., a credit card number and associated information, such as an expiration date and/or a card verification value (CVV) or other security code). Furthermore, in some implementations, the record may include other information associated with the user, such as a mailing address and/or a billing address.

In some implementations, as further shown in FIG. 1A, the record that is created, stored, or otherwise managed by the credential device may include a unique identifier associated with the user device. For example, the unique identifier may be a telephone number associated with the user device, a serial number associated with the user device, and/or an identifier that uniquely identifies the user device on a wireless network (e.g., an international mobile equipment identity, an international mobile subscriber identity, and/or a media access control address, among other examples). Accordingly, as described herein, the unique identifier may create a binding between the user and the user device operated by the user, such that the credential device can identify the user based on a message that is transmitted from the user device to the credential device. For example, when the user transmits a message from the user device to the credential device to initiate a contactless credential exchange at a transaction terminal, the credential device may identify the user that transmitted the message based on the unique identifier of the user device that was used to transmit the message. In this way, the credential device may identify the primary payment credential (and/or related information) that is associated with the user, whereby the credential device may generate a virtual credential that is linked to the primary payment credential to facilitate a contactless transaction at the transaction terminal.

In some implementations, when the user registers for the contactless transaction service, the credential device may present one or more options associated with the contactless transaction service to the user via the user device. For example, the credential device may provide the user with an option to use the contactless transaction service for in-person transactions at a physical point-of-sale (PoS) terminal, for online transactions at a virtual PoS terminal, and/or for person-to-person payments, among other examples. Additionally, or alternatively, the credential device may provide the user with an option to limit a number of virtual credentials that can be linked to the primary payment credential, an option to indicate whether virtual credentials are to be bound to specific merchants or allowed for use at different merchants, an option to indicate whether the virtual credentials are to be limited to a one-time use or a specific value, and/or an option to indicate when and/or whether the virtual credentials are to expire. In another example, the credential device may present the user with an option to link the contactless transaction service with a contact tracing and/or proximity tracking service (e.g., such that the user may be prompted to use the contactless transaction service when location data or interaction data associated with the user device indicates that there may be a risk of infectious disease in an area around the user device). In this way, registration data for the contactless transaction service can be used to automatically manage various parameters to improve the security and/or safety of the contactless transaction service.

As shown in FIG. 1B, and by reference number 130, the user device may transmit, and the credential device may receive, a request to initiate a contactless transaction based on a merchant-specific unique identifier. For example, in some implementations, the user device may be used to transmit, to the credential device, a message that includes a merchant-specific unique identifier that is associated with a specific transaction terminal operated by the merchant. In some implementations, the transaction terminal may be a physical PoS terminal (e.g., a register or checkout terminal), an online or virtual PoS terminal, and/or a device that belongs to another user and is equipped with a capability to accept mobile payments, among other examples. For example, in some implementations, the transaction terminal may display a message that indicates a capability to accept a contactless mobile payment, or the message may be printed on a tent card or a display placard near the transaction terminal. Furthermore, in some implementations, the message may include instructions to indicate a manner in which the contactless transaction is to be initiated. For example, as shown by reference number 140, the message may display a QR code that encodes the merchant-specific identifier.

Accordingly, when the user device scans the QR code using a camera of the user device, the user device may transmit the request to the credential device (e.g., via an application program interface call), and the request may include the merchant-specific unique identifier. Additionally, or alternatively, as further shown by reference number 140, the message displayed by and/or near the transaction terminal may indicate text (e.g., a specific phrase or sequence of characters) to be sent to an address associated with the credential device, where the text indicates the merchant-specific unique identifier. In this case, the request may include a text message that is sent to the address associated with the credential device (e.g., the destination address indicated in the message displayed by and/or near the transaction terminal), and the text message may include or otherwise indicate the merchant-specific unique identifier. In this way, when the user device transmits the message using the merchant-specific unique identifier, the credential device may identify the user requesting the contactless transaction based on the unique identifier of the user device (e.g., the telephone number, serial number, and/or network identifier associated with the user device), and the credential device may further identify the intended recipient of the transaction based on the merchant-specific unique identifier included in the request.

As further shown in FIG. 1B, and by reference number 150, the credential device may generate a merchant-bound payment credential associated with the merchant-specific unique identifier based on authenticating the request from the user device. For example, in some implementations, the credential device may communicate with the user device to validate an identity associated with the user operating the user device (e.g., as an additional security measure to prevent fraud in case another user gains unauthorized access to the user device and/or spoofs the unique identifier of the user device, among other examples). For example, the credential device may transmit, to the user device, a message that includes a prompt to validate that the user operating the user device is authorized to access (e.g., make charges against) the primary payment credential associated with the user device. In some implementations, the prompt may indicate that the user is to provide a biometric input (e.g., a fingerprint or facial scan) to verify that the user is authorized to access the primary payment credential, or the prompt may request that the user enter a user name and password, enter a one-time code sent to an email address or phone number associated with the user device, provide an answer to one or more security questions, and/or provide other suitable information to enable a multi-factor authentication.

Accordingly, based on validating the identity of the user operating the user device or otherwise authenticating the request received from the user device, the credential device may generate a merchant-bound payment credential to be used in a contactless transaction at the transaction terminal. For example, the merchant-bound payment credential may be a virtual credential, sometimes referred to as a virtual payment credential, a virtual card number, and/or a virtual credit card, among other examples. As described herein, a virtual credential may refer to a computer-generated version of a primary payment credential (e.g., a credit card number or other primary account number), and the virtual credential may be linked to the primary payment credential and used as a substitute for the primary payment credential in a transaction. For example, a transaction backend system may issue a transaction card (e.g., a credit card), and the credential device may issue one or more virtual credentials that can be used with different merchant transaction systems.

In this case, the credential device may configure each virtual credential to be associated with a particular merchant. For example, the primary payment credential may be associated with multiple virtual credentials, which may include a first virtual credential usable with a first merchant only, a second virtual credential useable with a second merchant only, and so on. As shown by reference number 160, each virtual credential may be linked to the primary payment credential to enable transactions using a particular virtual credential to be charged to an account associated with the primary credential. Furthermore, as shown in FIG. 1B, a particular virtual credential may be associated with a specific value or amount, which may be indicated in the request received from the user device. In this way, the virtual credential may be valid for a specific merchant only and for a specific amount only, which may provide security against fraudulent activity. Additionally, or alternatively, the virtual credential may be associated with a maximum value, and charges may be authorized against the virtual credential up to the maximum value (e.g., to allow the user to conduct multiple transactions using the same virtual credential without having to request additional virtual credentials for the same merchant).

Accordingly, by generating a merchant-bound virtual credential that can generally be used in the same way as a primary payment credential (e.g., a credit card), the merchant-bound virtual credential can offer increased security in a contactless transaction that may be conducted without a signature or a personal identification number (PIN) verification (e.g., to allow the transaction to be conducted without the user having to touch a stylus device or keypad and/or without the user having to come into proximity with another person). Furthermore, the merchant-bound virtual credential can provide additional security and robustness against fraud relative to using the primary payment credential. For example, if a security breach at a particular merchant were to result in a first virtual credential being exposed or otherwise compromised (e.g., to a hacker or fraudster), the virtual credential could be used only at the particular merchant and would be unusable with any other merchant.

Furthermore, in cases where the merchant-bound virtual credential is only valid for a specific value or a maximum value, the potential for fraud may be limited if unscrupulous personnel associated with the merchant were to attempt to use the virtual credential for other, unauthorized transactions. In this way, using the virtual credential as the contactless payment credential may reduce a risk and/or an extent to which the virtual credential can be fraudulently used, thereby improving information security and/or reducing monetary losses relative to use of the primary payment credential. In such a case, the compromised virtual credential may be invalidated, and a new virtual credential may be generated without affecting the primary payment credential and/or any other virtual credentials that may be linked to the primary payment credential. Furthermore, virtual credentials may provide similar protection against phishing scams or other fraud or abuse by unscrupulous merchants, especially when the value of the virtual credential is limited to a specific amount and/or a maximum amount. This may minimize an inconvenience associated with issuing a new primary payment credential and may reduce network resources that would otherwise be consumed by updating different merchant systems with new payment credentials when a primary payment credential is compromised.

As shown in FIG. 1C, and by reference number 170, the credential device may transmit, to the transaction terminal, information related to the merchant-bound virtual credential. For example, in some implementations, the information transmitted to the transaction terminal may include an account identifier associated with the virtual credential (e.g., a sixteen (16) digit virtual card that is linked to the primary account number associated with the user) and any other information that may be needed to process a transaction using the virtual credential (e.g., an expiration date, a CVV, a billing address, and/or an authorized amount, among other examples). Furthermore, in cases where the contactless transaction involves a payment for goods to be delivered (e.g., to the user of the user device or a third-party recipient) and/or a payment for services to be rendered at a particular location (e.g., at a home or business of the user of the user device or a third-party recipient), the information transmitted to the transaction terminal may include a delivery address, a mailing address, and/or another suitable address where the goods are to be delivered and/or where the services are to be rendered. Furthermore, in some implementations, the credential device may identify the specific transaction terminal to receive the information related to the merchant-bound payment credential based on the merchant-specific unique identifier provided in the request from the user device.

In this way, as shown by reference number 180, the transaction terminal may process the contactless transaction using the information related to the merchant-bound virtual credential in generally the same manner as a typical credit card transaction. For example, as shown in FIG. 1C, the transaction terminal may communicate with a transaction backend system to request authorization for one or more charges against the merchant-bound virtual credential, where the request may include a merchant identifier, an amount, and/or other information associated with the transaction to be authorized. The transaction backend system may process the transaction, which may include verifying that the merchant identifier matches the merchant identifier associated with the merchant-bound virtual credential and/or verifying that the requested amount equals the authorized amount for the merchant-bound virtual credential and/or does not exceed a maximum authorized amount for the merchant-bound virtual credential, among other examples.

In some implementations, in cases where the transaction backend system authorizes and processes the contactless transaction, the transaction backend system may transmit, and the credential device may receive, information indicating that a transaction associated with the virtual credential has been processed. In such cases, the credential device may associate the transaction with the primary payment credential associated with the user (e.g., charge the transaction to the user's primary payment credential). Furthermore, as shown by reference number 190, the credential device may transmit, to the user device, a message to confirm that the transaction has been successfully processed. In this way, the user of the user device may securely conduct an electronic transaction at a physical or online transaction terminal without exposing the user's actual credit card details and without coming into contact or close physical proximity with the transaction terminal and/or any personnel that may be operating the transaction terminal.

As indicated above, FIGS. 1A-1C are provided as an example. Other examples may differ from what is described with regard to FIGS. 1A-1C.

Figure 2:
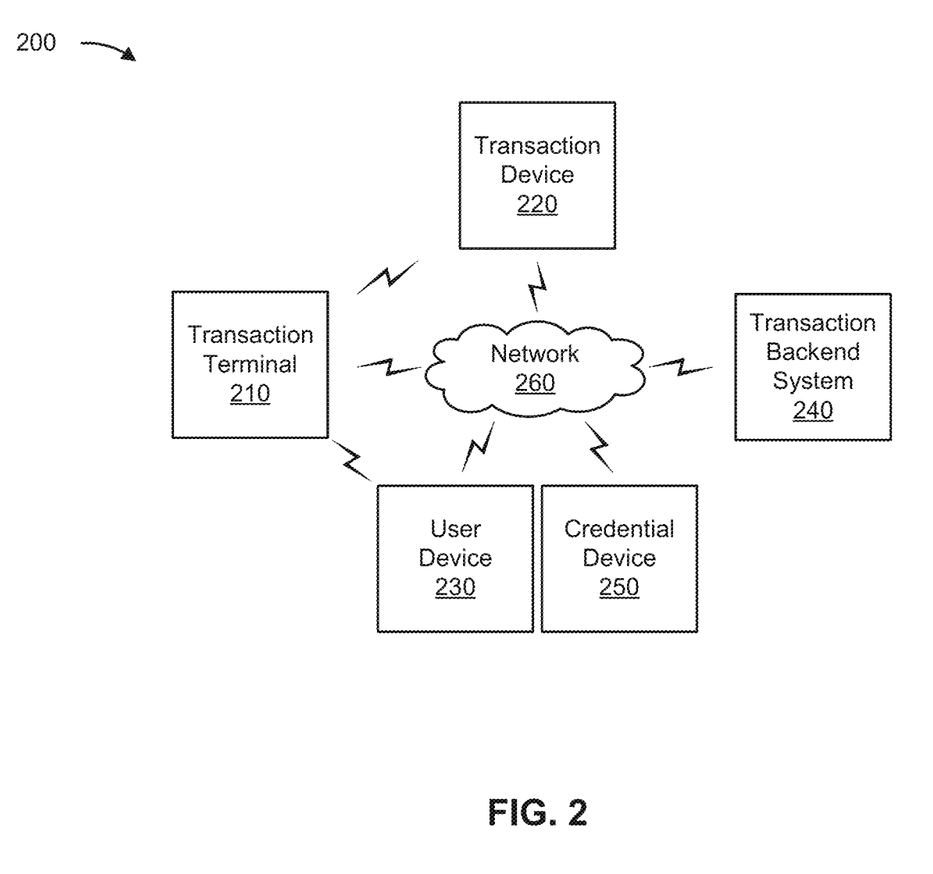
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, a credential device 250, and/or a network 260. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or the user device 230 and/or to facilitate interaction with and/or authorization from an owner or accountholder of the transaction device 220 and/or the user device 230. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card, among other examples. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account)

associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication while in close physical proximity (e.g., using NFC).

In some implementations, the account information associated with the transaction device may include a primary payment credential (e.g., a primary credit card number) and may further include one or more virtual payment credentials that are linked to the primary payment credential. For example, as described above, a virtual credential is a payment credential, associated with a user account, that allows a transaction to be performed without using the primary payment credential associated with the user account. For example, the virtual credential can be a virtual credit card number that can be used to conduct transactions associated with a user account (e.g., rather than using, and therefore exposing, an actual credit card number associated with the primary payment credential for the user account). In some cases, the virtual credential may be associated with a particular entity, such as a merchant (e.g., such that the virtual credential is valid for transactions associated with only the particular entity).

The user device 230 includes one or more devices capable of being used for an electronic transaction, as described above in connection with the transaction device 220. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The credential device 250 includes one or more devices capable of processing, authorizing, and/or facilitating a transaction using a payment credential, such as a primary credential and/or a virtual credential that is linked to the primary credential. For example, the credential device 250 may be associated with the transaction backend system 240 and may include one or more servers and/or computing hardware (e.g., in a cloud computing environment or separate from a cloud computing environment) configured to receive, store, and/or communicate information associated with one or more payment credentials that can be used to conduct an electronic transaction. For example, the credential device 250 may include one or more storage devices or storage components to store information related to one or more primary payment credentials associated with a user and one or more virtual or merchant-bound payment credentials that are linked to the one or more primary payment credentials. Furthermore, in some implementations, the credential device 250 may include one or more communication components (e.g., a receiver, a transmitter, a transceiver, a modem, a network interface card, and/or an antenna) that can be used to transmit, to the transaction terminal 210 and/or the user device 230, information related to the primary payment credential(s) and/or the virtual or merchant-bound payment credential(s) and/or information related to one or more transactions performed using the primary payment credential(s) and/or the virtual or merchant-bound payment credential(s).

The network 260 includes one or more wired and/or wireless networks. For example, the network 260 may include a cellular network, a public land mobile network, a local area network, a wide area network, a metropolitan area network, a telephone network, a private network, the Internet, and/or a combination of these or other types of networks. The network 260 enables communication among the devices of environment 200. In some implementations, the transaction terminal 210 may communicate with the transaction device 220 and/or the user device 230 using a first network (e.g., a contactless network or by coming into contact with the transaction device 220 and/or the user device 230) and may communicate with the transaction backend system 240 and/or the credential device 250 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
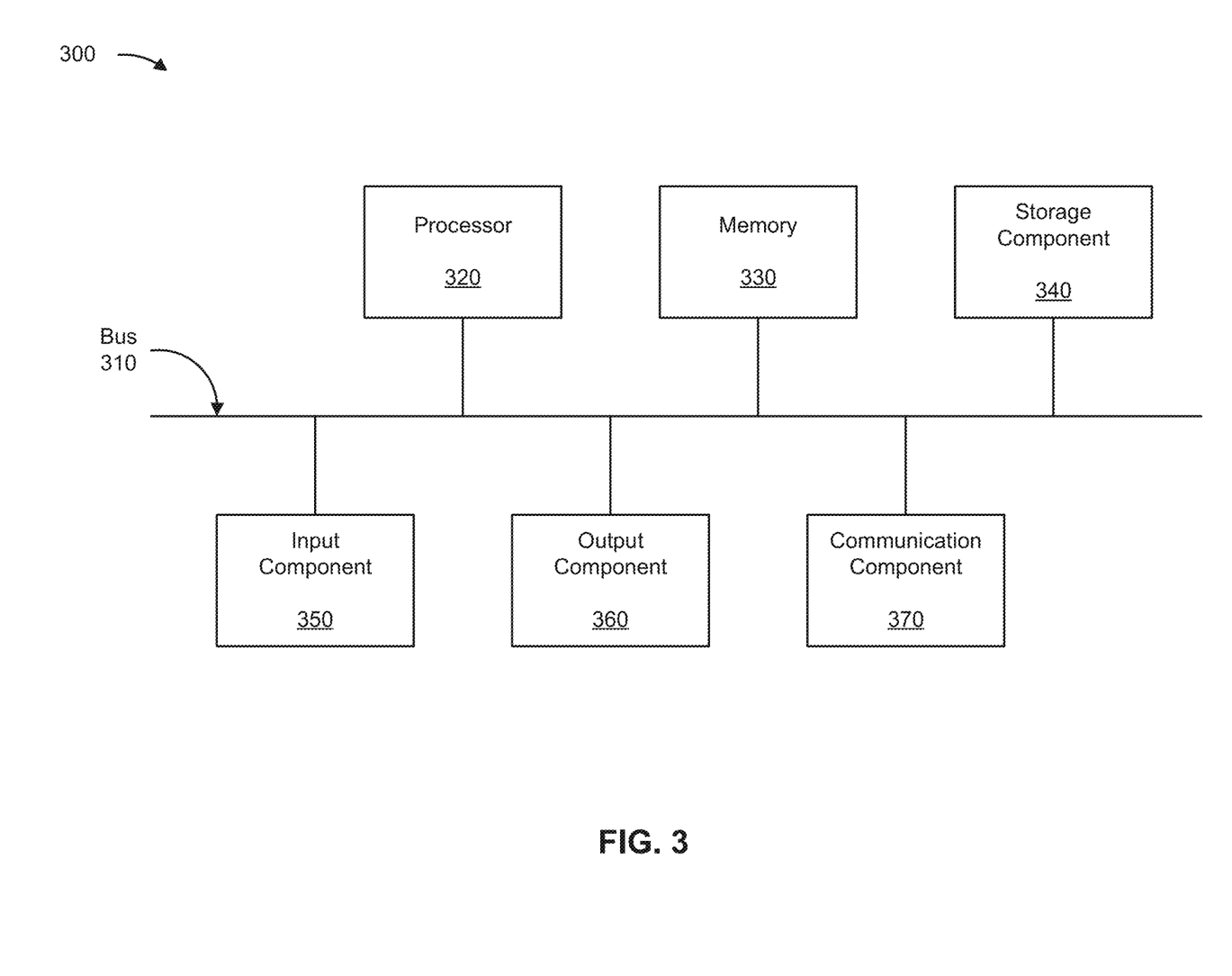
FIG. 3 is a diagram of example components of one or more devices of FIG. 2.

FIG. 3 is a diagram of example components of a device 300, which may correspond to transaction terminal 210, transaction device 220, user device 230, transaction backend system 240, and/or credential device 250. In some implementations, transaction terminal 210, transaction device 220, user device 230, transaction backend system 240, and/or credential device 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
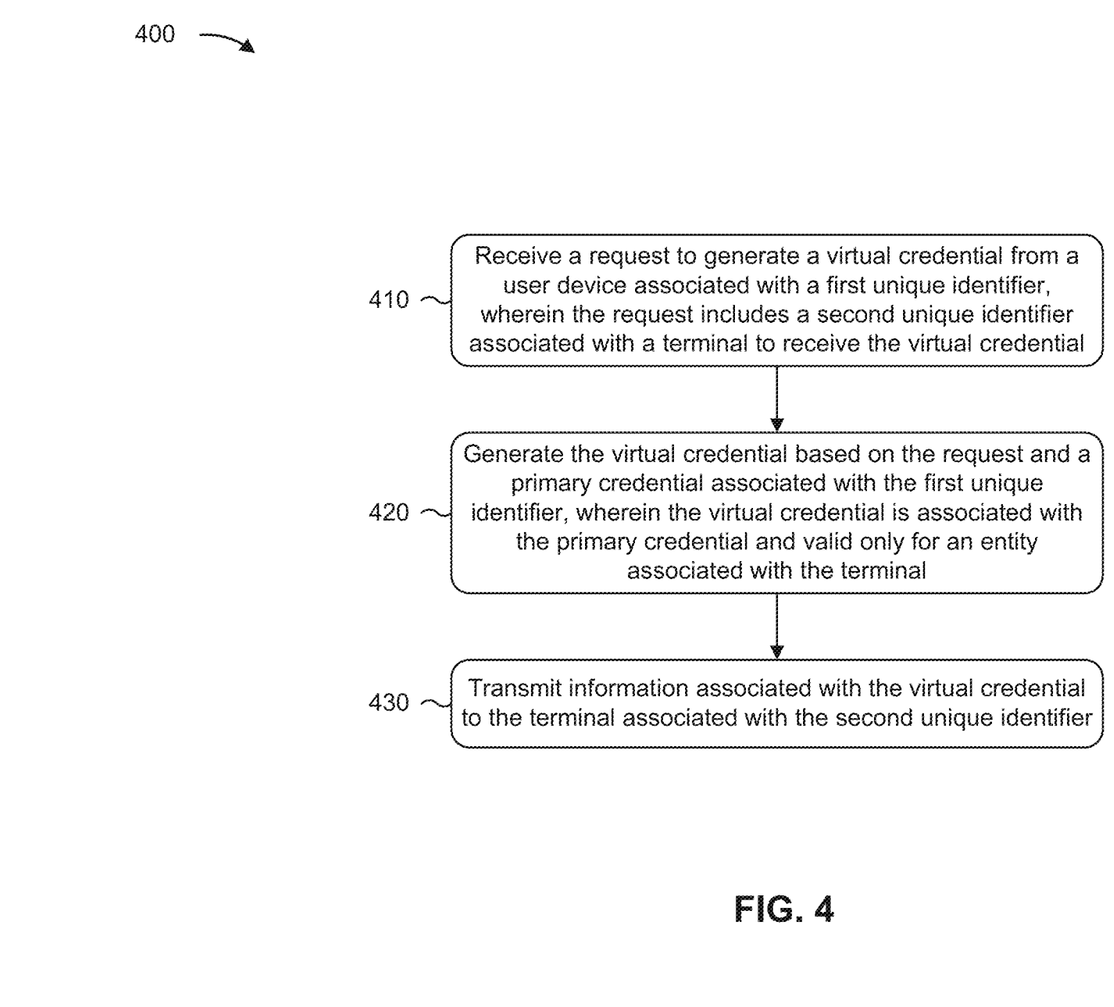
FIGS. 4-5 are flowcharts of example processes relating to a secure contactless credential exchange.

FIG. 4 is a flowchart of an example process 400 associated with a secure contactless credential exchange. In some implementations, one or more process blocks of FIG. 4 may be performed by a credential device (e.g., credential device 250). In some implementations, one or more process blocks of FIG. 4 may be performed by another device or a group of devices separate from or including the credential device, such as transaction terminal 210, transaction device 220, user device 230, and/or transaction backend system 240. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a request to generate a virtual credential from a user device associated with a first unique identifier (block 410). In some implementations, the request includes a second unique identifier associated with a terminal to receive the virtual credential. As further shown in FIG. 4, process 400 may include generating the virtual credential based on the request and a primary credential associated with the first unique identifier (block 420). In some implementations, the virtual credential is associated with the primary credential and valid only for an entity associated with the terminal. As further shown in FIG. 4, process 400 may include transmitting information associated with the virtual credential to the terminal associated with the second unique identifier (block 430).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
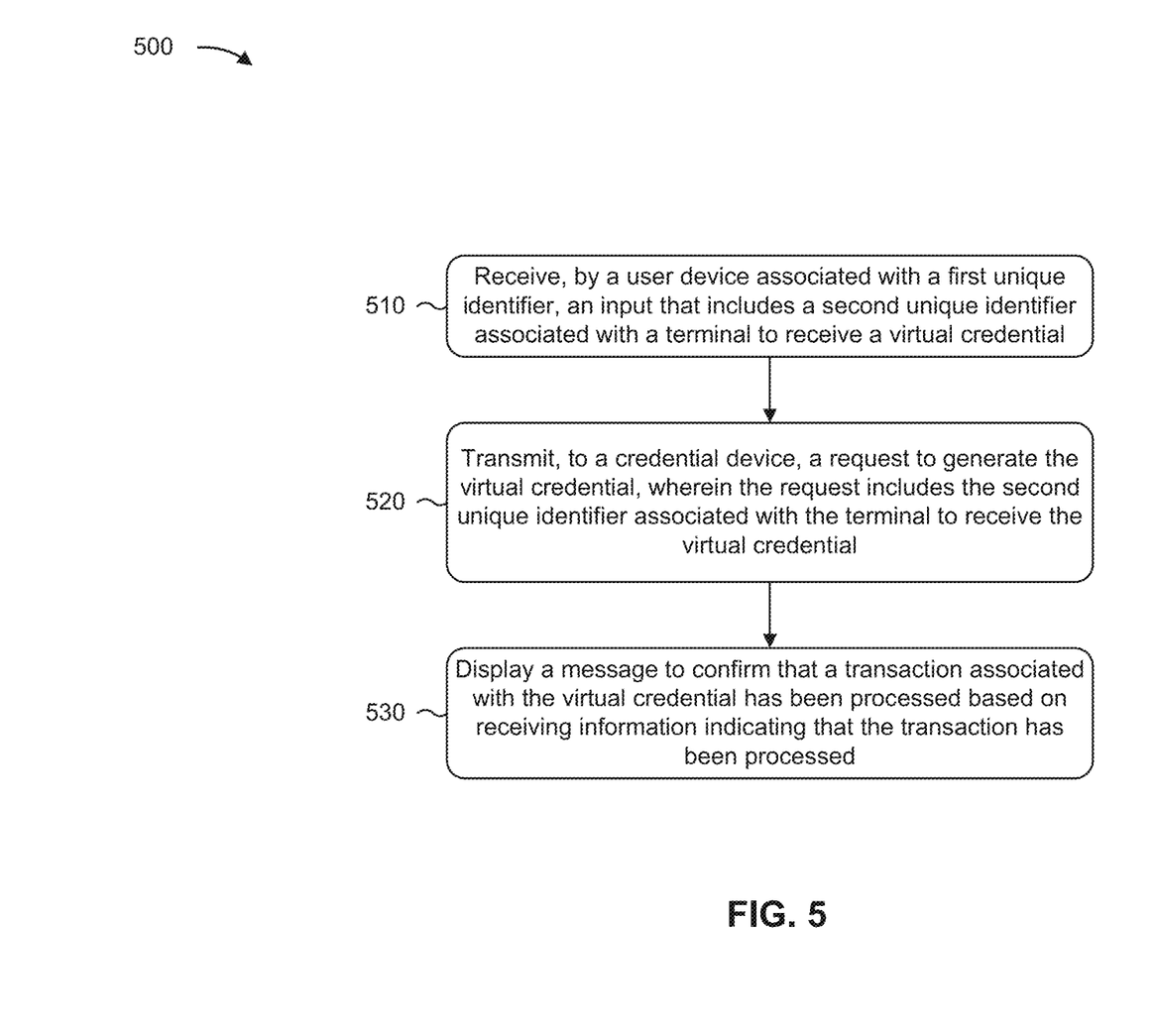

FIG. 5 is a flowchart of an example process 500 associated with a secure contactless credential exchange. In some implementations, one or more process blocks of FIG. 5 may be performed by a user device (e.g., user device 230). In some implementations, one or more process blocks of FIG. 5 may be performed by another device or a group of devices separate from or including the user device, such as transaction terminal 210, transaction device 220, transaction backend system 240, and/or credential device 250. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving an input that includes a second unique identifier associated with a terminal to receive a virtual credential (block 510). In some implementations, the input may be received by the user device, which is associated with a first unique identifier.

As further shown in FIG. 5, process 500 may include transmitting, to a credential device, a request to generate the virtual credential (block 520). In some implementations, the request may include the second identifier associated with the terminal to receive the virtual credential. As further shown in FIG. 5, process 500 may include displaying a message to confirm that a transaction associated with the virtual credential has been processed based on receiving information indicating that the transaction has been processed (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for securely providing a credential, the system comprising:
   one or more memories; and
   one or more processors, communicatively coupled to the one or more memories, configured to:
      register a user device with a contactless transaction service, wherein a primary payment credential of a payment account is associated with a user of the user device;
      receive, by a credential device and from the user device and based on registering with the contactless transaction service, an electronic message that includes a request to initiate a contactless transaction, associated with the contactless transaction service, between the user device and a specific transaction terminal operated by a merchant,
         wherein the electronic message includes a first unique identifier of a specific terminal device operated by an entity, and
         wherein the electronic message is transmitted from the user device based on the user device receiving an input of information provided at the specific transaction terminal for the contactless transaction service;
      generate, by the credential device and based on authenticating the electronic message and based on the first unique identifier, a virtual credential that is associated with the merchant,
         wherein the virtual credential is linked to the primary payment credential, and
         wherein the virtual credential is configured as a substitute for the primary payment credential;
      identify, by the credential device and based on the first unique identifier included in the electronic message from the user device, the specific transaction terminal; and
      transmit, by the credential device and based on identifying the specific transaction terminal, information associated with the virtual credential to the specific transaction terminal,
         wherein transmitting the information associated with the virtual credential causes authorization of the contactless transaction.

2. The system of claim 1, wherein the virtual credential is associated with a second unique identifier that includes at least one of:
   a telephone number associated with the user device,
   a serial number associated with the user device, or
   an identifier that uniquely identifies the user device on a wireless network.

3. The system of claim 1, wherein the request includes a text message or an application program interface call from the user device associated with the first unique identifier.

4. The system of claim 1, wherein the virtual credential is one of multiple virtual credentials that are associated with the primary payment credential.

5. The system of claim 1, wherein the one or more processors are further configured to:

transmit, to the user device, a message that includes a prompt to validate an identity associated with a user of the user device,
  wherein the virtual credential is generated and the information associated with the virtual credential is transmitted to the specific transaction terminal based on receiving information to validate the identity associated with the user of the user device.

6. The system of claim 1, wherein the information associated with the virtual credential includes a mailing address associated with a user of the user device.

7. The system of claim 1, wherein the one or more processors are further configured to:
  receive information indicating that a transaction associated with the virtual credential has been processed,
    wherein the transaction is associated with the contactless transaction; and
  associate the transaction with the primary payment credential based on the information indicating that the transaction associated with the virtual credential has been processed.

8. The system of claim 1, wherein the one or more processors are further configured to:
  receive information indicating that a transaction associated with the virtual credential has been processed,
    wherein the transaction is associated with the contactless transaction; and
  transmit, to the user device, a message to confirm that the transaction has been processed.

9. The system of claim 1, wherein a value of the virtual credential is indicated in the request, and
  wherein the virtual credential is at least one of:
    valid only for the value of the virtual credential, or
    valid for a maximum amount.

10. A method for securely providing a credential, comprising:
  registering a user device with a contactless transaction service, wherein a primary payment credential of a payment account is associated with a user of the user device;
  receiving, by a credential device and from the user device and based on registering with the contactless transaction service, an electronic message that includes a request to initiate a contactless transaction, associated with the contactless transaction service, between the user device and a specific transaction terminal operated by a merchant,
    wherein the electronic message from the user device includes a first unique identifier of the specific transaction terminal, and
    wherein the electronic message is transmitted from the user device based on the user device receiving an input of information provided at the specific transaction terminal for the contactless transaction service;
  generating, by the credential device, based on authenticating the electronic message, and based on the first unique identifier, a virtual credential that is associated with the merchant,
    wherein the virtual credential is linked to the primary payment credential, and
    wherein the virtual credential is configured as a substitute for the primary payment credential; and
  transmitting, by the credential device, information associated with the virtual credential to the specific transaction terminal,
    wherein transmitting the information associated with the virtual credential causes authorization of the contactless transaction.

11. The method of claim 10, wherein the virtual credential is associated with a second unique identifier that includes at least one of:
  a telephone number associated with the user device,
  a serial number associated with the user device, or
  an identifier that uniquely identifies the user device on a wireless network.

12. The method of claim 10, wherein the virtual credential is one of multiple virtual credentials that are associated with the primary payment credential.

13. The method of claim 10, wherein the information associated with the virtual credential includes a mailing address associated with a user of the user device.

14. The method of claim 10, further comprising:
  receiving information indicating that a transaction associated with the virtual credential has been processed,
    wherein the transaction is associated with the contactless transaction;
  associating the transaction with the primary payment credential based on the information indicating that the transaction associated with the virtual credential has been processed; and
  transmitting, to the user device, a message to confirm that the transaction has been processed.

15. The method of claim 10, wherein a value of the virtual credential is indicated in the request, and
  wherein the virtual credential is at least one of:
    valid only for the value of the virtual credential, or
    valid for a maximum amount.

16. A non-transitory computer-readable medium storing a set of instructions, the set of instructions comprising:
  one or more instructions that, when executed by one or more processors, cause the one or more processors to:
    register a user device with a contactless transaction service, wherein a primary payment credential of a payment account is associated with a user of the user device;
    receive, by a credential device and from the user device and based on registering with the contactless transaction service, an electronic message that includes a request to initiate a contactless transaction, associated with the contactless transaction service, between the user device and a specific transaction terminal operated by a merchant,
      wherein the electronic message includes a first unique identifier of the specific transaction terminal, and
      wherein the electronic message is transmitted from the user device based on the user device receiving an input of information provided at the specific transaction terminal for the contactless transaction service;
    generate, by the credential device and based on authenticating the request, and based on the first unique identifier, a virtual credential that is associated with the merchant,
      wherein the virtual credential is linked to the primary payment credential, and
      wherein the virtual credential is configured as a substitute for the primary payment credential;
    transmit, by the credential device, information associated with the virtual credential to the specific transaction terminal; and receive information indicating that a transaction associated with the virtual credential has been processed, wherein the transaction is associated with the contactless transaction.

17. The non-transitory computer-readable medium of claim 16, wherein the one or more instructions, when executed by the one or more processors, further cause the one or more processors to:

transmit, to the user device, a message to confirm that the transaction has been processed.

18. The non-transitory computer-readable medium of claim 16, wherein the virtual credential is one of multiple virtual credentials that are associated with the primary payment credential.

19. The non-transitory computer-readable medium of claim 16, wherein the one or more instructions, when executed by the one or more processors, further cause the one or more processors to:

transmit, to the user device, a message that includes a prompt to validate an identity associated with a user of the user device, wherein the one or more instructions cause the one or more processors to generate the virtual credential and transmit the information associated with the virtual credential to the specific transaction terminal based on receiving information to validate the identity associated with the user of the user device.

20. The non-transitory computer-readable medium of claim 16, wherein a value of the virtual credential is indicated in the request, and wherein the virtual credential is at least one of:
valid only for the value of the virtual credential, or
valid for a maximum amount.

* * * * *